US010529458B2

(12) United States Patent
Kanuch et al.

(10) Patent No.: US 10,529,458 B2
(45) Date of Patent: Jan. 7, 2020

(54) INTEGRAL ISOLATION VALVE SYSTEMS FOR LOSS OF COOLANT ACCIDENT PROTECTION

(71) Applicant: BWXT mPower, Inc., Charlotte, NC (US)

(72) Inventors: David J Kanuch, Charlotte, NC (US); Paul P. DiFilipo, Lynchburg, VA (US)

(73) Assignee: BWXT mPower, Inc., Charlotte, NC (US)

( * ) Notice: Subject to any disclaimer, the term of this patent is extended or adjusted under 35 U.S.C. 154(b) by 315 days.

(21) Appl. No.: 14/337,268

(22) Filed: Jul. 22, 2014

(65) Prior Publication Data

US 2016/0027535 A1    Jan. 28, 2016

(51) Int. Cl.
    *G21C 15/18* (2006.01)
    *G21C 13/02* (2006.01)
    *G21C 9/00* (2006.01)

(52) U.S. Cl.
    CPC ............ *G21C 15/182* (2013.01); *G21C 9/00* (2013.01); *G21C 13/02* (2013.01)

(58) Field of Classification Search
    CPC .......... G21C 15/18; G21C 9/004; G21C 9/00; G21C 1/322; G21C 13/02; G21C 19/307;
    (Continued)

(56) References Cited

U.S. PATENT DOCUMENTS 3,779,865 A * 12/1973 Schafstall ................ G21C 9/00
                                                    376/281

3,935,063 A *  1/1976 Dunckel ............. F28D 15/0275
                                                  165/104.21
(Continued)

FOREIGN PATENT DOCUMENTS

CN    1067133 A    12/1992
CN    1080769 A    1/1994
(Continued)

OTHER PUBLICATIONS

Chang, "Advanced Design Features Adopted In SMART", IAEA-SR-218/28, Aug. 2002.*
(Continued)

*Primary Examiner* — Peter M Poon
*Assistant Examiner* — Daniel Wasil
(74) *Attorney, Agent, or Firm* — Nelson Mullins Riley & Scarborough LLP (57) ABSTRACT

A nuclear reactor includes a nuclear reactor core comprising fissile material disposed in a reactor pressure vessel having vessel penetrations that exclusively carry flow into the nuclear reactor and at least one vessel penetration that carries flow out of the nuclear reactor. An integral isolation valve (IIV) system includes passive IIVs each comprising a check valve built into a forged flange and not including an actuator, and one or more active IIVs each comprising an active valve built into a forged flange and including an actuator. Each vessel penetration exclusively carrying flow into the nuclear reactor is protected by a passive IIV whose forged flange is directly connected to the vessel penetration. Each vessel penetration carrying flow out of the nuclear reactor is protected by an active IIV whose forged flange is directly connected to the vessel penetration. Each active valve may be a normally closed valve.

19 Claims, 4 Drawing Sheets

(58) Field of Classification Search
CPC .......... G21C 1/32; G21C 1/084; G21C 13/00;
G21C 1/086; G21C 15/182; G21C
13/032; G21C 13/036
USPC ....... 376/282, 283, 299, 298, 293, 294, 347,
376/216, 281, 207, 210; 976/DIG. 196,
976/DIG. 139, DIG. 22, DIG. 298,
976/DIG. 15
See application file for complete search history.

(56) References Cited

U.S. PATENT DOCUMENTS

| | | | |
|---|---|---|---|
| 4,077,837 A | 3/1978 | Schabert et al. | |
| 4,113,561 A * | 9/1978 | Fidler | G21C 15/18 376/299 |
| 4,473,528 A | 9/1984 | Kleimola | |
| 4,533,514 A * | 8/1985 | Yamamoto | G21C 7/00 376/214 |
| 4,576,482 A | 3/1986 | Loose | |
| 4,753,771 A | 6/1988 | Conway et al. | |
| 4,783,306 A * | 11/1988 | Vecsey | G21D 9/00 376/213 |
| 4,986,956 A | 1/1991 | Garabedian | |
| 5,049,353 A | 9/1991 | Conway et al. | |
| 5,106,571 A | 4/1992 | Wade et al. | |
| 5,202,083 A * | 4/1993 | Spinks | G21C 15/18 376/299 |
| 5,268,943 A | 12/1993 | Corlett et al. | |
| 5,276,720 A | 1/1994 | Oosterkamp et al. | |
| 5,282,230 A | 1/1994 | Billig et al. | |
| 5,349,617 A | 9/1994 | Gautier | |
| 5,426,681 A | 6/1995 | Aburomia | |
| 5,577,085 A * | 11/1996 | Gou | G21C 9/00 376/294 |
| 5,661,770 A | 8/1997 | Spinks | |
| 5,684,846 A * | 11/1997 | Meneely | G21C 9/00 376/283 |
| 5,694,442 A | 12/1997 | Cinotti et al. | |
| 5,887,043 A | 3/1999 | Spinks | |
| 7,154,982 B2 | 12/2006 | Gautier et al. | |
| 8,170,173 B2 | 5/2012 | Reyes, Jr. et al. | |
| 2008/0212733 A1* | 9/2008 | Pop | G21C 15/182 376/282 |
| 2009/0129530 A1 | 5/2009 | Reyes, Jr. et al. | |
| 2009/0129531 A1 | 5/2009 | Reyes, Jr. et al. | |
| 2010/0278294 A1 | 11/2010 | Kwon et al. | |
| 2012/0177168 A1 | 7/2012 | Reyes, Jr. et al. | |
| 2012/0207260 A1 | 8/2012 | Houghton et al. | |
| 2012/0243651 A1* | 9/2012 | Malloy | G21C 15/18 376/282 |
| 2012/0294408 A1 | 11/2012 | Reyes, Jr. et al. | |
| 2013/0070887 A1* | 3/2013 | Kim | G21C 15/18 376/282 |
| 2013/0156143 A1* | 6/2013 | Bingham | G21C 15/18 376/298 |
| 2013/0251085 A1* | 9/2013 | Bergman | G21C 15/18 376/282 |
| 2013/0294567 A1* | 11/2013 | Malloy | G21C 13/036 376/352 |
| 2013/0336440 A1 | 12/2013 | Memmott et al. | |
| 2013/0336441 A1 | 12/2013 | Cronje et al. | |
| 2014/0016734 A1* | 1/2014 | Moon | G21C 15/18 376/282 |
| 2014/0050292 A1 | 2/2014 | Kim et al. | |
| 2014/0294134 A1* | 10/2014 | Haratyk | G21C 15/18 376/298 |

FOREIGN PATENT DOCUMENTS

| | | |
|---|---|---|
| CN | 101933099 A | 12/2010 |
| CN | 102737739 A | 10/2012 |
| CN | 202549319 U | 11/2012 |
| EP | 2096644 | 9/2009 |

OTHER PUBLICATIONS

International Search Report and Written Opinion dated Oct. 23, 2015 for PCT/US2015/041345.
Chinese Office Action for Chinese Application No. 201580040363.0 dated Sep. 20, 2017.
Extended European Search Report dated Feb. 15, 2018, for corresponding European application No. 15825164.5.

* cited by examiner

INTEGRAL ISOLATION VALVE SYSTEMS FOR LOSS OF COOLANT ACCIDENT PROTECTION

This invention was made with Government support under Contract No. DE-0000583 awarded by the Department of Energy. The Government has certain rights in this invention.

BACKGROUND

The following pertains to the nuclear reactor arts, nuclear power arts, nuclear reactor safety arts, and related arts.

Existing nuclear power plants are typically light water thermal nuclear reactors of the boiling water reactor (BWR) or pressurized water reactor (PWR) designs. In such a reactor, a nuclear reactor core comprising fissile material (typically a uranium compound such as $UO_2$ enriched in fissile $^{235}U$) is disposed in coolant (purified water) contained at an operational pressure and temperature in a reactor pressure vessel. A nuclear chain reaction involving fission of the fissile $^{235}U$ generates heat in the nuclear reactor core which is transferred to the coolant. In a BWR design, the heat directly converts coolant to steam, and steam separator/dryer hardware contained in the reactor pressure vessel generates steam that is output via large-diameter piping to a turbine to generate electricity (in a nuclear power plant setting; more generally the output steam is used to perform other useful work). The condensed coolant from the turbine is fed back into the BWR pressure vessel via additional large-diameter piping. In a PWR design, the primary coolant remains in a liquid state (e.g. subcooled) and is piped via large-diameter piping to an external steam generator where heat from the (primary) reactor coolant converts (separate secondary) coolant to steam that in turn drives the turbine. The condensed coolant from the steam generator is fed back into the PWR pressure vessel via additional large-diameter piping.

Safe operation of such reactors includes providing protection against radiological release to the environment. To this end, it is known to surround the nuclear reactor with a radiological containment structure typically constructed of steel and/or steel-reinforced concrete, and to implement safety systems, with redundancy, to remediate events in which reactor operation moves outside of a design envelope. One class of events is a loss of coolant accident (LOCA), in which reactor coolant escapes from a reactor pressure vessel break or, more commonly, from a break in a large-diameter pipe that connects with the reactor pressure vessel at a vessel penetration. A LOCA break which occurs between the vessel penetration and a closest pipe valve is particularly problematic, since reactor coolant loss from such a break continues even after the pipe valve is closed.

A known solution is to provide an integral isolation valve (IIV) at the vessel penetration. An IIV comprises a valve built into a flange that connects with the pressure vessel. Since the IIV is integrated directly into the vessel penetration, closing the IIV ensures stoppage of reactor coolant loss at the LOCA break.

A disadvantage of using IIV's to protect against LOCA events is that pneumatic, hydraulic, or electric control lines are needed to operate the IIV's, and these control lines are run up to the reactor pressure vessel so that they are exposed to heat and radiation flux generated by the operating nuclear reactor. It has been contemplated to employ wireless valve control, but this introduces its own set of problems. The wireless receiver must be built into the IIV and hence is exposed to high temperature and radiation fluxes, and the intangible nature of the wireless communication can make it difficult to detect problems in the valve control system.

An additional disadvantage of using IIV's to protect against LOCA events is that the valve actuator control can be complex, entailing detection of a LOCA condition based on reactor pressure, coolant level, or the like, and operating the IIV's in accordance with the detected reactor condition. The operation is not straightforward, because the response may require keeping some IIV's open and other IIV's closed.

BRIEF SUMMARY

In some embodiments described herein as illustrative examples, a nuclear island comprises: a nuclear reactor including a nuclear reactor core comprising fissile material disposed in a reactor pressure vessel; an emergency core cooling (ECC) system connected to the nuclear reactor through an ECC vessel feedthrough; a reactor coolant inventory and purification system (RCIPS) connected to the nuclear reactor to inject coolant into the reactor pressure vessel through a make-up line vessel feedthrough and to extract coolant from the reactor pressure vessel through a let-down line vessel feedthrough; and an integral isolation valve (IIV) system. The IIV system includes: a passive IIV comprising a check valve built into a forged flange that is connected directly to the ECC vessel feedthrough; a passive IIV comprising a check valve built into a forged flange that is connected directly to the make up line vessel feedthrough; and an active IIV comprising an active valve built into a forged flange that is connected directly to the let-down line vessel feedthrough. The nuclear island may further include a residual heat removal (RHR) system having an RHR inlet connected to the nuclear reactor to through an RHR out vessel feedthrough and an RHR outlet connected to the nuclear reactor to through an RHR return vessel feedthrough, with the IIV system further including a passive IIV comprising a check valve built into a forged flange that is connected directly to the RHR return vessel feedthrough and an active IIV comprising an active valve built into a forged flange that is connected directly to the RHR out vessel feedthrough. The RHR system may comprise an air- or water-cooled RHR heat exchanger. The nuclear island may further include a pressure sensor disposed in the reactor pressure vessel and configured to sense reactor coolant pressure, and/or a level sensor disposed in the reactor pressure vessel and configured to sense reactor coolant level. A reactor control system is suitably configured to close the active IIV connected directly to the RHR out vessel feedthrough in response to the reactor coolant pressure sensed by the pressure sensor exceeding a threshold pressure, and/or to close the active IIV connected directly to the letdown line vessel feedthrough in response to the reactor coolant level sensed by the pressure sensor falling below a threshold reactor coolant level.

In some embodiments described herein as illustrative examples, a nuclear island is disclosed. A nuclear reactor includes a nuclear reactor core comprising fissile material disposed in a reactor pressure vessel that has a plurality of vessel penetrations that exclusively carry flow into the nuclear reactor and at least one vessel penetration that carries flow out of the nuclear reactor. An integral isolation valve (IIV) system includes a plurality of passive IIVs each comprising a check valve built into a forged flange and not including an actuator, and one or more active IIVs each comprising an active valve built into a forged flange and including an actuator. Each vessel penetration that exclusively carries flow into the nuclear reactor is protected by a passive IIV whose forged flange is directly connected to the vessel penetration. Each vessel penetration that carries flow out of the nuclear reactor is protected by an active IIV whose forged flange is directly connected to the vessel penetration. In some embodiments each vessel penetration that carries flow out of the nuclear reactor exclusively carries flow out of the nuclear reactor. In some embodiments each active IIV further includes a manual backup for the actuator. The check valve of each passive IIV suitably admits flow at above a threshold pressure into the reactor pressure vessel, while blocking flow otherwise. The active valve of each active IIV is suitably a normally closed valve.

In some embodiments described herein as illustrative examples, a nuclear reactor includes a nuclear reactor core comprising fissile material disposed in a reactor pressure vessel. A plurality of auxiliary systems is in fluid communication with the nuclear reactor via vessel penetrations. Each vessel penetration is either a fluid inlet vessel penetration carrying fluid into the nuclear reactor or a fluid outlet vessel penetration carrying fluid out of the nuclear reactor. An integral isolation valve (IIV) system includes at least one passive IIV comprising a check valve built into a forged flange and not including an actuator, and at least one active IIV comprising an active valve built into a forged flange and including an actuator. Each fluid inlet vessel penetration is protected by a passive IIV whose forged flange is directly connected to the vessel penetration. Each fluid outlet vessel penetration is protected by an active IIV whose forged flange is directly connected to the vessel penetration. The plurality of auxiliary systems may include an emergency core cooling (ECC) system and a reactor coolant inventory and purification system (RCIPS), and may further include a residual heat removal (RHR) system. In some embodiments the at least one active IIV is configured to be closed by reactor coolant pressure upon loss of actuator power.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention. This disclosure includes the following drawings.

DETAILED DESCRIPTION OF THE PREFERRED EMBODIMENTS

The IIV systems and operational methods disclosed herein are based on certain observations made herein regarding such systems and methods.

One observation is that any vessel penetration that exclusively provides flow into the nuclear reactor can be sufficiently protected by a passive integral isolation valve (IIV) in the form of a check valve built into the forged flange that admits flow into the reactor pressure vessel but blocks flow out of the reactor pressure vessel (i.e. admits flow at above a threshold pressure into the reactor pressure vessel, while blocking flow otherwise). Such a check valve includes no actuator and operates entirely passively, and is sufficient to prevent coolant loss at a pipe break with no intervention by reactor operators.

A second observation is that any vessel penetration that exclusively provides flow out of the nuclear reactor must be protected by an active valve—that is, a valve whose operation is driven by an electric (e.g. motor-operated), hydraulic, or pneumatic actuator (optionally with manual backup, e.g. a manual hand wheel backup). The active valve is closed by receiving an actuator signal cau (or by operating the manual backup if available). Optionally, the reactor control system is configured to automatically open or close the active IIV under specified reactor condition(s), such as based on a threshold reactor pressure and/or threshold reactor coolant level.

A third observation is that in the case of a vessel penetration that exclusively provides flow out of the nuclear reactor and has an active IIV with manual backup, an advantageous variant is to configure the actuator-driven closure to override any attempt to open the valve using the manual backup, so that the actuator serves as a lock-out mechanism for the IIV.

Figure 1:
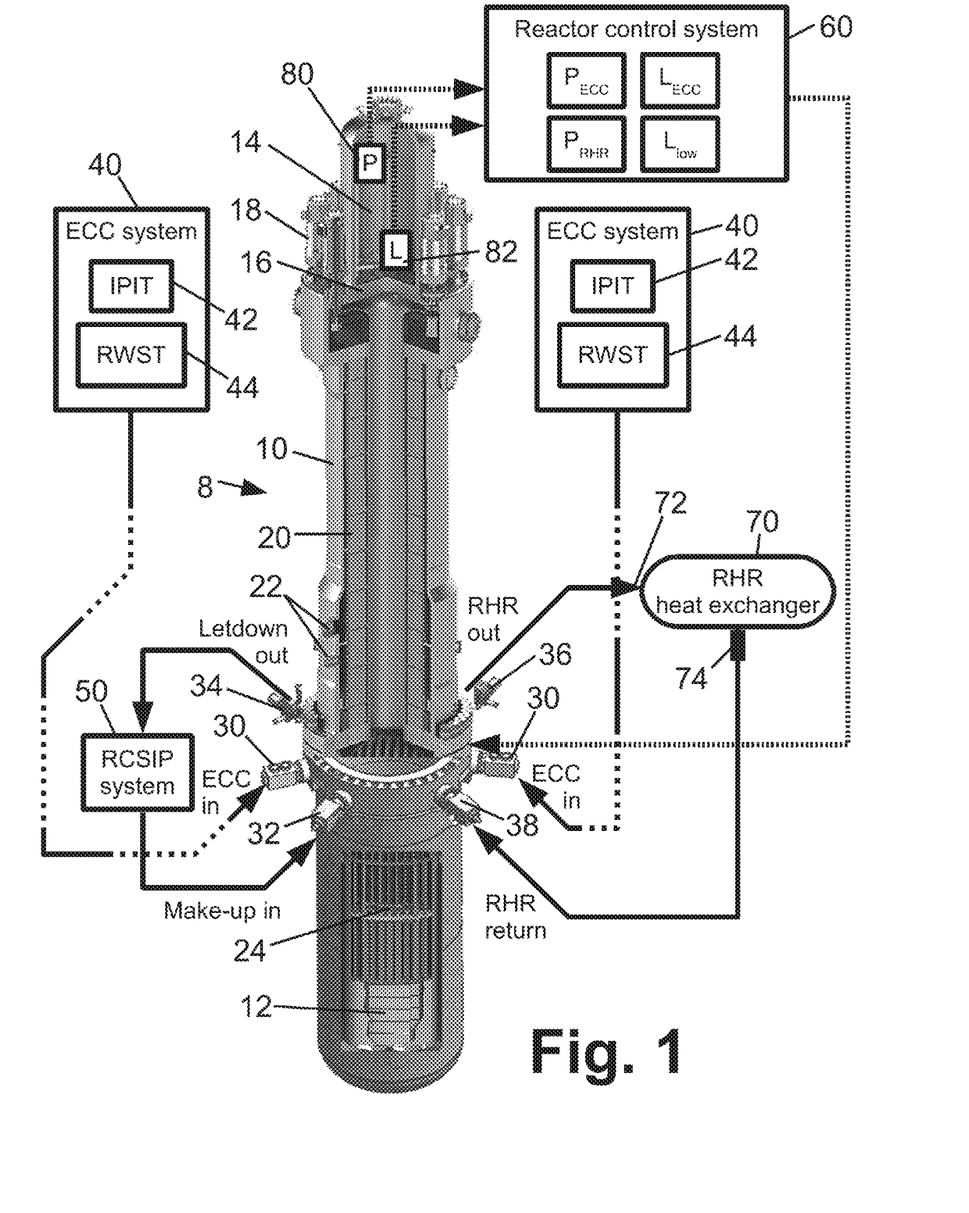
FIG. 1 diagrammatically shows a nuclear reactor with a system of passive and active integral isolation valves (IIV's) as disclosed herein, along with diagrammatic representation of associated sensors and control.

With reference to FIG. 1, an illustrative embodiment including an IIV system constructed based on the foregoing is described. A nuclear reactor 8 includes a reactor pressure vessel 10 that houses a reactor core 12 comprising fissile material immersed in coolant fluid. In a typical light water thermal nuclear reactor, the reactor core 12 comprises a uranium compound such as $UO_2$ that is enriched in the fissile $^{235}U$ isotope, and the coolant fluid is purified light water ($H_2O$). The illustrative nuclear reactor 8 is of the pressurized water reactor (PWR) type, in which the coolant water is maintained in a sub-cooled liquid state. The illustrative PWR 8 includes an integral pressurizer volume 14 defined at the top of the pressure vessel 10 by a baffle plate 16 or other suitable structure. During operation of the nuclear reactor, a steam bubble is maintained in the pressurizer volume 14, and reactor pressure is adjusted by heating or cooling the steam bubble (for example using resistive heaters, and spargers for cooling). In alternative embodiments (not shown), an external pressurizer is employed which is connected with the reactor pressure vessel by suitable piping.

The coolant inside the reactor vessel is circulated in order to heat sink the reactor core 12 and to extract heat generated by the reactor core 12. To this end, the illustrative PWR 8 includes reactor coolant pumps (RCPs) 18 mounted near the top of the pressure vessel 10 to assist or drive circulation of the coolant. In alternative embodiments (not shown), the RCPs may be located elsewhere, or may be internal canned pumps located inside the pressure vessel, or the RCPs may be omitted entirely and the coolant circulated by natural circulation driven by heat from the reactor core. The illustrative PWR also includes one or more internal steam generators 20 located inside the pressure vessel 10. In one embodiment, the steam generator(s) 20 suitably include tube-and-shell structures with reactor coolant flowing in one of the tubes and the surrounding shell and secondary coolant (different from the reactor coolant) flowing in the other of the tubes and surrounding shell (details not shown). The secondary coolant is distinct from the (primary) reactor coolant, and secondary coolant feed water is fed into, and steam extracted form, the steam generator(s) 20 via steam generator couplings 22. It may be noted that while these couplings 22 are vessel penetrations, they do not "see" reactor coolant pressure and a break in piping to the feed water inlet or from the steam outlet does not result in a radiological release into the radiological containment structure. Accordingly, while it is contemplated to provide IIV protection for couplings 22, this is not done in the embodiment of illustrative FIG. 1.

The illustrative PWR 8 includes internal control rod drive mechanisms (CRDMs) 24 that move neutron-absorbing control rods vertically into or out of the reactor core 12 in order to control the nuclear chain reaction in the core 12. The CRDMs 24 are preferably configured to respond to certain events by performing a scram operation in which the control rods are released and fall into the nuclear reactor under force of gravity in order to extinguish the nuclear chain reaction entirely.

The illustrative PWR 8 is an integral PWR in which stream generator(s) 20 are disposed inside the pressure vessel 10. In alternative embodiments (not shown) the steam generators are external units located outside of the pressure vessel, and large-diameter piping connects the external steam generators with the nuclear reactor. In such alternative embodiments, it is contemplated to include IIV protection for this piping as well since it carries reactor coolant to the external steam generators.

The illustrative integral PWR 8 advantageously has no large-diameter vessel penetrations that see reactor coolant (as already noted, the steam generator couplings 22 see only secondary coolant which does not contain radiological contamination and is typically at lower pressure compared with the reactor coolant inside the pressure vessel 10). In the illustrative integral PWR 8, the vessel penetrations include: two emergency core cooling (ECC) vessel penetrations protected by ECC IIVs 30; a make-up line vessel penetration protected by a make-up line IIV 32; a let-down line vessel penetration protected by a let-down line IIV 34; a residual heat removal (RHR) outlet line protected by an RHR out IIV 36; and an RHR return line protected by an RHR return IIV 38.

The ECC system is designed to deliver coolant water into the reactor pressure vessel 10 during certain events such as a loss of coolant accident (LOCA), in order to ensure that the reactor core 12 remains immersed in coolant water. A diagrammatically indicated illustrative ECC system 40 includes two water sources: an intermediate-pressure injection tank (IPIT) 42 that contains nitrogen-pressurized water; and a refueling water storage tank (RWST) 44. In a LOCA response the reactor is depressurized through the LOCA break and/or through designated depressurization valves. As the IPIT 42 is nitrogen-pressurized, water is injected as the pressure inside the nuclear reactor 8 dissipates. The water in the IPIT 42 is optionally borated (that is, contains a soluble boron compound) to assist in quenching the nuclear chain reaction in the reactor core 12 (this is a defense-in-depth measure, as scram of the control rods by the CRDMs 24 is the primary mechanism for quenching the nuclear chain reaction). After the pressure vessel 10 has depressurized to below a certain pressure threshold, the ECC valves operate to connect the RWST 44 to the ECC vessel penetration via the ECC IIV 30. The RWST is typically at an elevated position compared with the nuclear reactor 8, and thus water is gravity-fed from the RWST 44 into the pressure vessel 10. The capacity of the RWST 44 is designed to be sufficient to maintain water inflow into the pressure vessel 10 for a design-basis time interval in order to ensure the reactor core 12 remains immersed in coolant water. In the illustrative example of FIG. 1, the ECC system 40 comprises two redundant systems each connected with the pressure vessel 10 via its own designated ECC IIV 30—accordingly, there are two ECC IIV's 30 shown in FIG. 1. Such redundancy is advantageous due to the safety-critical nature of the ECC system 40.

Figure 2:
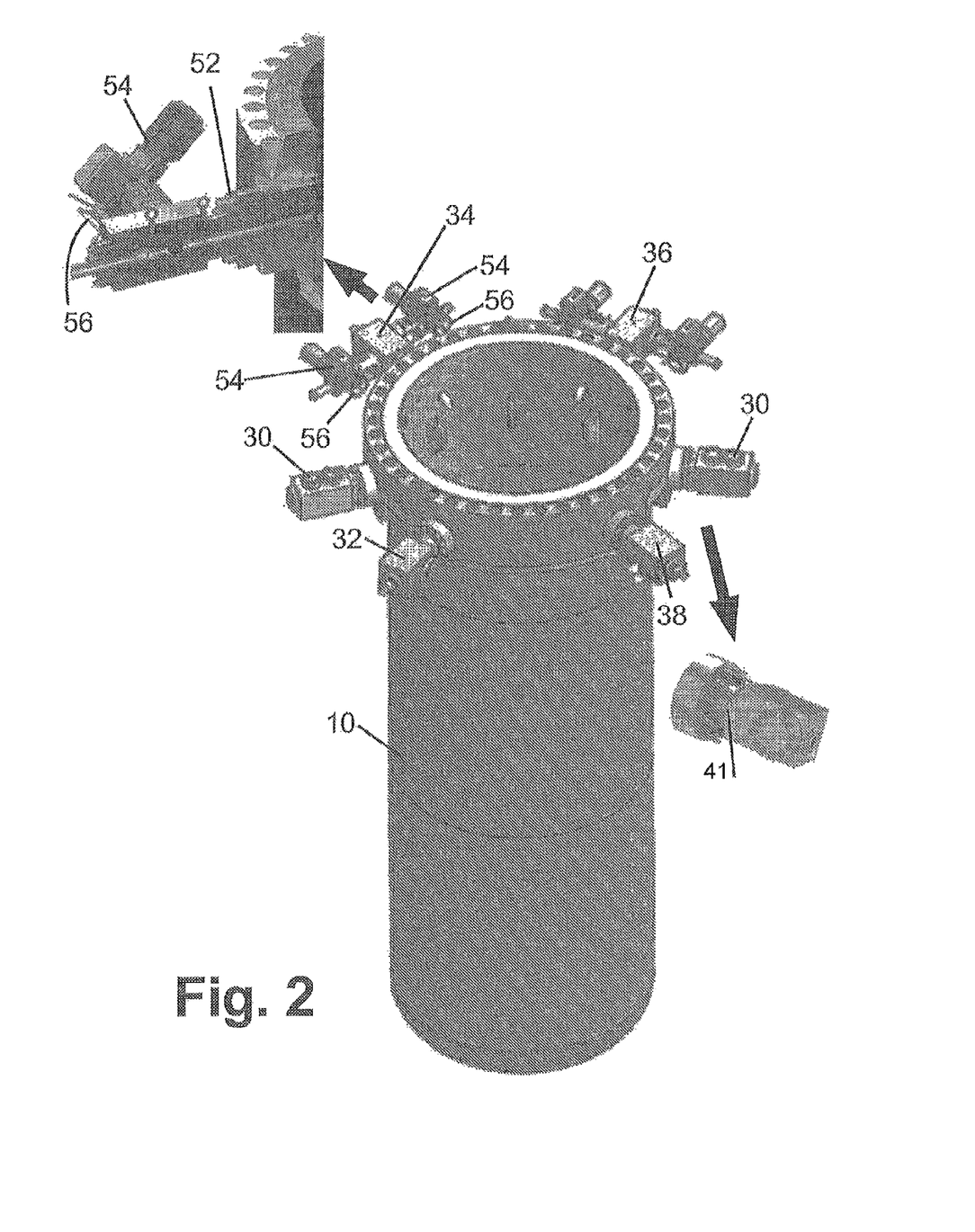
FIG. 2 diagrammatically shows a perspective view of the lower section of the reactor pressure vessel of FIG. 1 and the IIV's, with an illustrative example of a passive IIV and of an active IIV shown in insets.
Figure 4A:
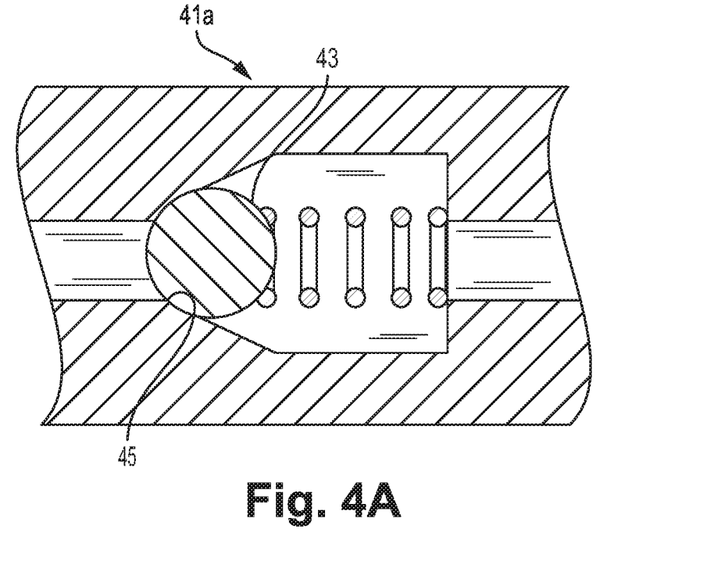
FIGS. 4A and 4B show cross-sectional views of IIVs in the form of check valves built into forged flanges.
Figure 4B:
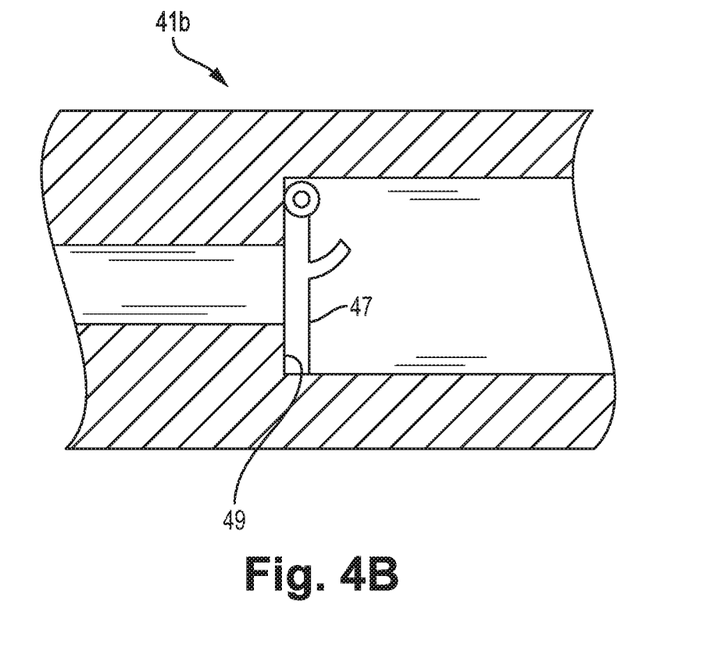

With continuing reference to FIG. 1 and with further reference to FIGS. 2, 4A and 4B, which show the lower section of the pressure vessel 10 with the upper section and internal components removed, the ECC IIV 30 exclusively provides flow into the nuclear reactor 8, and is suitably a passive IIV in the form of a check valve built into a forged flange 41 (see inset of FIG. 2) that connects (e.g. bolts) directly to the pressure vessel 10 and admits flow into the reactor pressure vessel but blocks flow out of the reactor pressure vessel. Said another way, the passive check valve IIV admits flow into the reactor pressure vessel at above a threshold pressure (which may be as low as zero in some embodiments), while blocking flow otherwise. The check valve may have any suitable check valve 41a configuration, such as a ball check valve configuration (see FIG. 4A, in which a ball 43 or other movable part is spring-biased against a valve seat 45 and is moved away from the valve seat against the spring force by pressure exceeding the threshold pressure for opening), a swing check valve 41b (see FIG. 4B, in which a door 47 or other movable part is hinged and seats against a valve seat 49 such that flow into the reactor opens the door to admit the inflow while flow out of the reactor closes the door against the valve seat to block outflow), or so forth. In some embodiments, the passive check valve IIV includes two (or more) check valves in series built into the forged flange 41, so as to provide redundancy in the event that one check valve malfunctions and fails to block the reverse flow (i.e. fails to block flow out of the reactor).

Because the passive check valve IIV 30 is passive, it cannot be controlled by an actuator, for example as part of the ECC operation. The passive check valve IIV 30 serves as a safety device to prevent loss of coolant through the protected ECC vessel penetration in the event of a pipe break on the line feeding into the ECC vessel penetration.

With continuing reference to FIGS. 1 and 2, a reactor coolant inventory/purification system (RCIPS) 50 connects with the nuclear reactor 8 via the make-up line vessel penetration protected by make-up line IIV 32 and the let-down line vessel penetration protected by the let-down line IIV 34. The RCIPS 50 performs various functions related to maintaining the reactor coolant quantity and purity. Coolant water is added to the pressure vessel 10 via the make-up line, and is removed from the pressure vessel 10 via the let-down line. The make-up line IIV 32 exclusively provides flow into the nuclear reactor 8, and is suitably a passive IIV in the form of a check valve built into a forged flange 41 (see inset of FIG. 2) that connects (e.g. bolts) directly to the pressure vessel 10 and admits flow into the reactor pressure vessel but blocks flow out of the reactor pressure vessel.

On the other hand, the let-down line IIV 34 exclusively provides flow out from the nuclear reactor 8, and is suitably an active IIV. In the illustrative example shown in the second inset of FIG. 2, a suitable active IIV includes a valve built into a forged flange 52 that further includes two redundant actuators 54 that may be operated electrically (for example, solenoid actuators), hydraulically or pneumatically (for example, hydraulic or pneumatic piston actuators). In active valves, a movable element is moved toward or away from a valve seat by the actuator. The active valve is preferably a "fail closed" valve, by which it is meant that upon loss of electrical (or hydraulic, or pneumatic) power the valve moves to its closed position under spring bias or another passive impetus. In another contemplated design, the actuator of the active valve opens the valve by moving the movable valve part inward (that is, toward the reactor 8 or, if the movable valve part is disposed partway inside the vessel penetration, moves the movable part further into the vessel penetration) so that in the event of loss of actuator power the reactor coolant pressure drives the movable part outward against the valve seat to achieve the normally closed state. In the illustrative example, the active IIV 34 also includes manual backup in the form of two redundant hand wheels 56.

The let-down line IIV 34 serves a safety function—for example, if a break occurs on the let-down line, the let-down line IIV 34 can be closed by an operator, either by operating a reactor control system 60 to send an actuation signal to the actuators 54 to close the IIV 34, or by operating a manual backup t mechanism 56. By closing the IIV 34, loss of reactor coolant via the break on the let-down line is terminated.

The reactor control system 60 is suitably implemented as a computer or other electronic system with suitable user interfacing devices such as one or more computer monitors or displays, keyboards, mice or other pointing devices, various combinations thereof, and so forth. The valve actuators 54 are operatively connected with the reactor control system 60 by electrical wiring, hydraulic lines, pneumatic lines, or so forth in accord with the type or types of valve actuators employed in the IIV system. The reactor control system 60 optionally includes non-computerized backup systems, such as a status display board with LED indicators and buttons or other electromechanical user inputs providing backup non-computerized control of the actuators 54. As previously noted, the active valves of the IIV system optionally include manual backup mechanisms such as the illustrative hand wheels 56.

In alternative embodiments, the active let-down line IIV 34 is used only for the aforementioned safety function, but is not used as a functional component during normal operation of the nuclear reactor 8. In this alternative approach, the active let-down line IIV 34 is kept open during normal reactor operation, and other valves (not shown) of the RCIPS 50 are opened and closed as appropriate to control the addition of make-up water to the pressure vessel 10. In this approach the let-down line IIV 34 is closed only in response to a safety-related situation such as a break on the let-down line, and the let-down line IIV 34 can be a two-state device, that is, either fully open or fully closed, but not continuously adjustable to "partially open" states in-between.

The residual heat removal (RHR) lines protected by the RHR out IIV 36 and the RHR return IIV 38 connect with an RHR heat exchanger 70 that may be air-cooled, water-cooled, or otherwise cooled. In a suitable embodiment, the RHR heat exchanger 70 operates in a active closed-loop: decay heat from the nuclear reactor core 12 heats coolant water that is carried by the RHR output line to the RHR heat exchanger 70 where water is cooled (thus expelling carried heat), and the condensate is channeled back to the reactor pressure vessel 10 via the RHR return line. In such a design, an RHR inlet 72 is connected to the nuclear reactor 8 to through an RHR out vessel feedthrough that is protected by the RHR out IIV 36, and an RHR outlet 74 is connected to the nuclear reactor 8 to through an RHR return vessel feedthrough that is protected by the RHR return IIV 38.

The RHR return IIV 38 protects the return line that channels condensate from the RHR heat exchanger 70 back to the reactor pressure vessel 10. The RHR return IIV 38 exclusively provides flow into the nuclear reactor 8, and is suitably a passive IIV in the form of a check valve built into a forged flange 41 (see inset of FIG. 2) that connects (e.g. bolts) directly to the pressure vessel 10 and admits flow into the reactor pressure vessel but blocks flow out of the reactor pressure vessel.

On the other hand, the RHR out IIV 36 exclusively carries flow out of the nuclear reactor 8, and is suitably an active IIV comprising an actuated valve (optionally with manual backup) built into a forged flange 52. The illustrative RHR out IIV 36 includes two redundant actuators 54 that may be operated electrically (for example, solenoid actuators), hydraulically or pneumatically (for example, hydraulic or pneumatic piston actuators), and also including manual backup in the form of two redundant hand wheels 56. In some embodiments, the RHR out IIV 36 may be used initiate the residual heat removal system by opening to initiate the active closed-loop circulation. In alternative embodiments, the RHR out IIV 36 serves only a safety function.

In the embodiment of FIGS. 1 and 2, each independent (i.e. redundant) ECC system 40 connects with the reactor pressure vessel 10 via a vessel penetration protected by ECC IIV 30 which initially carries high pressure flow from the IPIT 42, and then after depressurization carries low pressure flow from the RWST 44. This approach advantageously reduces the number of vessel penetrations. However, since each ECC vessel penetration exclusively carries flow into the nuclear reactor 8, it is contemplated to provide separate vessel penetrations for the IPIT 42 and the RWST 44, each protected by its own passive check valve IIV.

It will be noted that of the IIV's 30, 32, 34, 36, 38 are mostly of the passive check valve type—only the let-down line IIV 34 and the RHR out line IIV 36 are active and/or manually operated valves. Advantageously, this reduces the likelihood of reactor operator error in utilizing the IIV system during a LOCA or other event. As previously mentioned, the passive check valve IIV admits flow into the reactor pressure vessel at above a threshold pressure, while blocking flow otherwise. The threshold pressure for opening the check valve may be as low as zero in some embodiments. More generally, the threshold pressure for opening the check valve should be lower than a lowest expected pressure at the inlet to the check valve during normal operation in which fluid is to be flowed through the protected line—this ensures that the check valve does not hinder the normal operation of the protected system.

Figure 3:
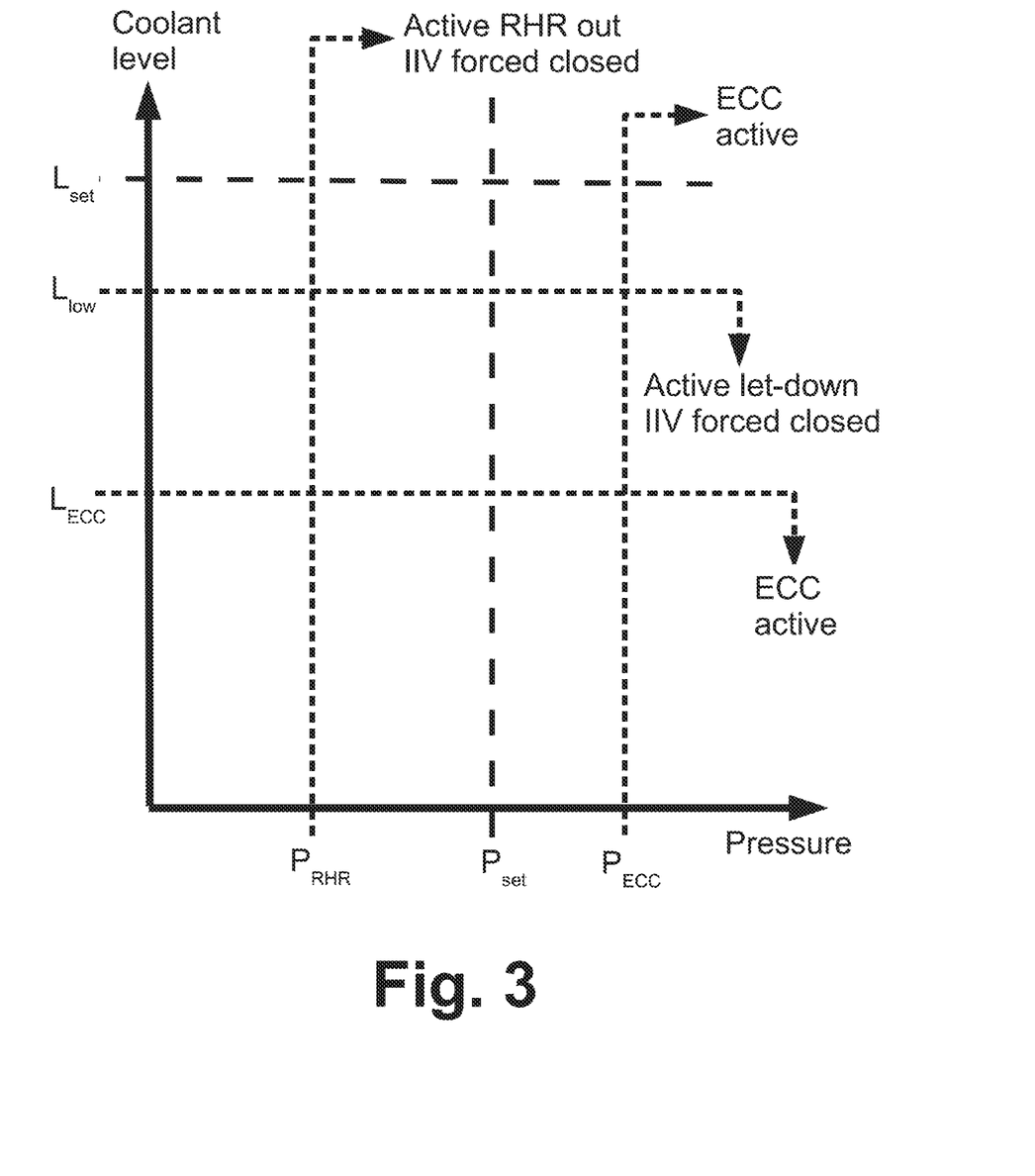
FIG. 3 diagrammatically shows operation of the IIV system to respond to various deviations from the design operational envelope of the reactor of FIG. 1.

With continuing reference to FIGS. 1 and 2 and with further reference to FIG. 3, the IIV system is also optionally configured to automatically respond to certain potentially unsafe reactor conditions. As diagrammatically indicated in FIG. 1, the nuclear reactor 8 typically includes sensors, such as an illustrative pressure sensor 80 and an illustrative reactor coolant level sensor 82 both located in the pressurizer volume 14. FIG. 3 diagrammatically shows a coolant level-pressure diagram with pressure on the abscissa and level on the ordinate. In FIG. 3, $P_{set}$ and $L_{set}$ denote the setpoint pressure and coolant level, respectively, for normal operation of the nuclear reactor 8. Also shown in FIG. 3 (and also diagrammatically indicated in the reactor control system 60 of FIG. 1) are certain thresholds: $P_{RHR}$, $P_{ECC}$, $L_{low}$, and $L_{ECC}$. These thresholds control automatic responses of the active IIV's 34, 36 as follows.

The pressure threshold $P_{RHR}$ controls automatic operation of the RHR out line. If the reactor pressure as measured by the pressure sensor 80 exceeds threshold $P_{RHR}$ then the RHR out line IIV 36 is kept closed.

The level threshold $L_{low}$ controls automatic closure of the let-down line IIV 34 in order to limit further loss of reactor coolant. If the reactor coolant water level measured by the level sensor 82 decreases below threshold $L_{low}$, then the let-down line IIV 34 automatically closes (or is held closed if it was already closed) so that no coolant is lost through the let-down line. Note that the make-up line is unaffected and may continue to provide make-up coolant to remedy the low level condition over time even after the reactor coolant level falls below the threshold $L_{low}$, which may enable remediation without activating the EEC system 40.

Also diagrammatically indicated in FIGS. 1 and 3 are pressure and level thresholds $P_{ECC}$ and $L_{ECC}$, respectively, that trigger activation of the ECC system 40. If the pressure measured by the pressure sensor 80 exceeds threshold $P_{ECC}$, or the coolant level measured by the level sensor 82 falls below threshold $L_{ECC}$, then the ECC system 40 is activated. Since the ECC IIVs 30 are passive check valve IIV's, there is no need to operate any valve actuators of the IIV system to initiate the ECC. However, it is contemplated to automatically close the let-down line IIV 34 upon initiation of ECC operation in order to prevent coolant loss through the let-down line.

The illustrative IIV's 30, 32, 34, 36, 38 are appropriate for the illustrative auxiliary systems including the ECC system 40, the RCIPS 50, and the RHR system 70. Other nuclear island designs may employ additional or other auxiliary systems, with variant or different vessel penetrations. The observations and principles disclosed herein for designing the IIV system and methods of operating same are readily adapted to such variant or different nuclear island designs. Under these observations and principles, the number of active IIV's is minimized by employing passive check valve IIV's at all vessel penetrations that exclusively provides flow into the nuclear reactor. System complexity is also advantageously reduced by avoiding the use of bi-directional vessel penetrations that carry flow both into and out of the reactor. Although this may entail adding an additional vessel penetration, the added vessel penetration is suitably protected by a passive check valve IIV.

Each passive IIV comprises a check valve built into a forged flange and not including an actuator. Each active IIV comprises an active valve built into a forged flange and including an actuator. By "built into" it is meant that the valve is secured to the forged flange and is disposed in the flange or may protrude partway into the vessel penetration so as to extend partway into the wall of the reactor pressure vessel 10. By being built into the forged flange in this way, the valve is shielded from external contact by the forged flange which is solidly connected to the vessel penetration by bolt/tapped hole combinations, bolt/nut combinations, or other flange fasteners.

Illustrative embodiments including the preferred embodiments have been described. While specific embodiments have been shown and described in detail to illustrate the application and principles of the invention and methods, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims. Obviously, modifications and alterations will occur to others upon reading and understanding the preceding detailed description. It is intended that the present disclosure be construed as including all such modifications and alterations insofar as they come within the scope of the appended claims or the equivalents thereof.

The claims are as follows:

1. A nuclear island comprising:
   a nuclear reactor including a nuclear reactor core comprising fissile material disposed in a reactor pressure vessel;
   an emergency core cooling (ECC) system connected to the reactor pressure vessel through an ECC pressure vessel feedthrough;
   a reactor coolant inventory and purification system (RCIPS) connected to the reactor pressure vessel to inject coolant into the reactor pressure vessel through a make-up line connected to a make-up line pressure vessel feedthrough and to extract coolant from the reactor pressure vessel through a let-down line connected to a let-down line pressure vessel feedthrough; and
   an integral isolation valve (IIV) system including:
      a passive IIV comprising a check valve built into a forged flange that is connected directly to the ECC pressure vessel feedthrough and a corresponding ECC system line,
      a passive IIV comprising a check valve built into a forged flange that is connected directly to the make-up line pressure vessel feedthrough and the make-up line, and
      an active IIV comprising an active valve built into a forged flange that is connected directly to the let-down line pressure vessel feedthrough and the let-down line,
      wherein the passive and active IIVs each have an outer diameter along its entire length that is greater than an outer diameter of the corresponding ECC system line, make-up line, and let-down line to which it is connected.

2. The nuclear island of claim 1 further comprising:
   a residual heat removal (RHR) system having an RHR inlet line connected to the reactor pressure vessel through an RHR pressure vessel inlet feedthrough and an RHR outlet line connected to the reactor pressure vessel through an RHR pressure vessel outlet feedthrough;
   wherein the IIV system further includes:
      a passive IIV comprising a check valve built into a forged flange that is connected directly to the RHR pressure vessel outlet feedthrough and the RHR outline line, and
      an active IIV comprising an active valve built into a forged flange that is connected directly to the RHR pressure vessel inlet feedthrough and the RHR inlet line,
      wherein the passive and active IIVs each have an outer diameter along its entire length that is greater than an outer diameter of the corresponding RHR outlet line and RHR inlet line, respectively, to which it is connected.

3. The nuclear island of claim 2 wherein the RHR system comprises an air- or water-cooled RHR heat exchanger.

4. The nuclear island of claim 2 further comprising:
   a pressure sensor disposed in the reactor pressure vessel and configured to sense reactor coolant pressure; and a reactor control system configured to close the active IIV connected directly to the RHR pressure vessel inlet feedthrough in response to the reactor coolant pressure sensed by the pressure sensor exceeding a threshold pressure.

5. The nuclear island of claim 1 further comprising:
a level sensor disposed in the reactor pressure vessel and configured to sense reactor coolant level;
a reactor control system configured to close the active IIV connected directly to the letdown line pressure vessel feedthrough in response to the reactor coolant level sensed by the pressure sensor falling below a threshold reactor coolant level.

6. A nuclear island comprising:
a nuclear reactor including a nuclear reactor core comprising fissile material disposed in a reactor pressure vessel that has a plurality of pressure vessel penetrations that exclusively carry flow into the reactor pressure vessel and at least one pressure vessel penetration that carries flow out of the reactor pressure vessel; and
an integral isolation valve (IIV) system including:
a plurality of passive IIVs each comprising a check valve built into a forged flange and not including an actuator, and
one or more active IIVs each comprising an active valve built into a forged flange and including an actuator,
wherein:
each pressure vessel penetration that exclusively carries flow into the reactor pressure vessel is protected by a passive IIV whose forged flange is directly connected to the corresponding pressure vessel penetration and a corresponding line, and
each pressure vessel penetration that carries flow out of the reactor pressure vessel is protected by an active IIV whose forged flange is directly connected to the corresponding pressure vessel penetration and a corresponding line,
wherein the passive and active IIVs each have an outer diameter along its entire length that is greater than an outer diameter of the corresponding line to which it is connected.

7. The nuclear island of claim 6 wherein each pressure vessel penetration that carries flow out of the reactor pressure vessel exclusively carries flow out of the reactor pressure vessel.

8. The nuclear island of claim 6 wherein each active IIV further includes a manual backup for the actuator.

9. The nuclear island of claim 6 further comprising:
an emergency core cooling (ECC) system connected to the reactor pressure vessel through a pressure vessel penetration that exclusively carries flow into the reactor pressure vessel and is protected by a passive IIV whose forged flange is directly connected to the pressure vessel penetration and a corresponding ECC system line,
wherein the passive IIV has an outer diameter that is greater along its entire length than an outer diameter of the corresponding ECC system line to which it is connected.

10. The nuclear island of claim 6 further comprising:
a reactor coolant inventory and purification system (RCIPS) connected to the reactor pressure vessel to inject coolant into the reactor pressure vessel through a vessel penetration that exclusively carries flow into the reactor pressure vessel and is protected by a passive IIV whose forged flange is directly connected to the pressure vessel penetration and a corresponding RCIPS line,
wherein the passive IIV has an outer diameter that is great along its entire length than an outer diameter of the corresponding RCIPS line to which it is connected.

11. The nuclear island of claim 10 wherein the RCIPS is further connected to the reactor pressure vessel to extract coolant from the reactor pressure vessel through a pressure vessel penetration that exclusively carries flow out of the reactor pressure vessel and is protected by an active IIV whose forged flange is directly connected to the pressure vessel penetration and a corresponding RCIPS line,
wherein the active IIV has an outer diameter that is greater along its entire length than an outer diameter of the corresponding RCIPS line to which it is connected.

12. The nuclear island of claim 11 further comprising:
a residual heat removal (RHR) system having:
an inlet line connected to the reactor pressure vessel through a pressure vessel penetration that exclusively carries flow out of the reactor pressure vessel and is protected by an active IIV whose forged flange is directly connected to the pressure vessel penetration and the inlet line, and
an outlet line connected to the reactor pressure vessel through a pressure vessel penetration that exclusively carries flow into the reactor pressure vessel and is protected by a passive IIV whose forged flange is directly connected to the pressure vessel penetration and the outlet line,
wherein the passive and active IIVs each have an outer diameter that is greater along its entire length than an outer diameter of the corresponding outlet line and inlet line, respectively, to which it is connected.

13. The nuclear island of claim 6 further comprising:
a residual heat removal (RHR) system having:
an inlet line connected to the reactor pressure vessel through a pressure vessel penetration that exclusively carries flow out of the reactor pressure vessel and is protected by an active IIV whose forged flange is directly connected to the pressure vessel penetration the inlet line, and
an outlet line connected to the reactor pressure vessel through a pressure vessel penetration that exclusively carries flow into the nuclear reactor pressure vessel and is protected by a passive IIV whose forged flange is directly connected to the pressure vessel penetration and the outlet line,
wherein the active and passive IIVs each have an outer diameter that is greater along its entire length than an outer diameter of the corresponding inlet line and outlet line to which it is connected.

14. The nuclear island of claim 6 wherein the check valve of each passive IIV admits flow at above a threshold pressure into the reactor pressure vessel, while blocking flow otherwise.

15. The nuclear island of claim 6 wherein the active valve of each active IIV is a normally closed valve.

16. The nuclear island of claim 6 wherein the active valve of at least one active IIV is configured to be closed by reactor coolant pressure upon loss of actuator power.

17. A nuclear island comprising:
a nuclear reactor including a nuclear reactor core comprising fissile material disposed in a reactor pressure vessel;
a plurality of auxiliary systems in fluid communication with the reactor pressure vessel via pressure vessel penetrations wherein each said pressure vessel penetration is either a fluid inlet pressure vessel penetration carrying fluid into the reactor pressure vessel or a fluid outlet pressure vessel penetration carrying fluid out of the reactor pressure vessel; and an integral isolation valve (IIV) system including:
  at least one passive IIV comprising a check valve built into a forged flange and not including an actuator, and
  at least one active IIV comprising an active valve built into a forged flange and including an actuator,
wherein:
  each fluid inlet pressure vessel penetration is protected by a passive IIV whose forged flange is directly connected to the pressure vessel penetration and a corresponding line, and
  each fluid outlet pressure vessel penetration is protected by an active IIV whose forged flange is directly connected to the pressure vessel penetration and a corresponding line,
  wherein the passive and active IIVs each have an outer diameter that is greater along its entire length than an outer diameter of the corresponding line to which it is connected.

18. The nuclear island of claim 17 wherein the plurality of auxiliary systems includes an emergency core cooling (ECC) system and a reactor coolant inventory and purification system (RCIPS).

19. The nuclear island of claim 18 wherein the plurality of auxiliary systems further includes a residual heat removal (RHR) system.

* * * * *

UNITED STATES PATENT AND TRADEMARK OFFICE
CERTIFICATE OF CORRECTION

PATENT NO. : 10,529,458 B2
APPLICATION NO. : 14/337268
DATED : January 7, 2020
INVENTOR(S) : David J. Kanuch et al.

Page 1 of 1

It is certified that error appears in the above-identified patent and that said Letters Patent is hereby corrected as shown below:

In the Specification
In Column 1, Line 6, please change "DE-0000583" to --DE-NE0000583--.
In Column 2, Line 29, please change "make up" to --make-up--.

In the Claims
In Column 12, Line 4, Claim 10, please change "great" to --greater--.

Signed and Sealed this
Seventeenth Day of March, 2020

Andrei Iancu
*Director of the United States Patent and Trademark Office*